LINE SEQUENTIAL COLOR TELEVISION RECEIVER

Filed Aug. 23, 1966 5 Sheets-Sheet 1

INVENTOR
YASUMASA SUGIHARA
BY Linton and Linton
ATTORNEYS

INVENTOR
YASUMASA SUGIHARA
BY Linton and Linton
ATTORNEYS

INVENTOR
YASUMASA SUGIHARA
BY Linton and Linton
ATTORNEYS

LINE SEQUENTIAL COLOR TELEVISION RECEIVER

Filed Aug. 23, 1966

5 Sheets-Sheet 4

INVENTOR
YASUMASA SUGIHARA
BY Linton and Linton
ATTORNEYS

INVENTOR
YASUMASA SUGIHARA
BY Linton and Linton
ATTORNEYS 3,527,878
LINE SEQUENTIAL COLOR TELEVISION RECEIVER Yasumasa Sugihara, Kawasaki-shi, Japan, assignor to The General Corporation, Kanagawa-ken, Japan, a corporation of Japan Filed Aug. 23, 1966, Ser. No. 574,337
Claims priority, application Japan, Aug. 26, 1965, 40/51,683
Int. Cl. H04n 9/36
U.S. Cl. 178—5.4 1 Claim This invention relates to a color television receiver and more particularly to a compatible color television receiver of the line-sequential type.

For purposes of illustration, the invention will be described in connection with the NTSC system utilizing a single electron gun type of picture tube and operating with a total of 525 scanning lines to constitute a frame of picture, each line of scan being allotted for each of the three primary color component signals and switched at every horizontal scanning cycle. For instance, if a color information is presented in the sequence of red, green, blue, red, green, blue . . . it will take three scanning lines to complete the display of white color. Such line-sequential television system is advantageous in that it requires a relatively simple circuit arrangement and makes the best utilization of the electron beam to provide a bright reproduced image.

However, inasmuch as it takes three scanning lines to complete the reproduction of a white color information with the above line-sequential system, the vertical resolution of a televised image tends to deteriorate and the chrominance information representative of fine elemental areas cannot be reproduced with adequate fidelity.

Whereas, it is the primary object of this invention to provide new methods and means for eliminating the above-noted difficulties. This is accomplished by providing a selected one of the scanning lines with a delay corresponding to one horizontal scanning cycle so as to cause the signal on the delayed line to be superimposed upon that on the preceding line. To carry this method into practice, the invention provides a new circuit concept readily acceptable to existing compatible color television receivers. The new circuit arrangement according to the invention includes a first demodulator connected to the output of the usual bandpass amplifier, a delay circuit connected to said amplifier for providing the output thereof with a delay corresponding to one horizontal scanning line, a second demodulator of the same characteristic as the first demodulator for demodulating the output from said delay circuit, a matrix circuit for combining the outputs of the two demodulators and a chrominance amplifier for amplifying the output of the matrix circuit for application to the picture tube.

The invention will be better understood from the following description taken in connection with the accompanying drawings in which:

FIGS. 1 through 6 inclusive are utilized to explain the manner in which a color signal is scanned in a conventional line-sequential color television receiver; the symbol (*a*) being representative of the side of a television camera and the symbol (*b*) representative of the side of a receiver;

FIGS. 7 through 12 inclusive are utilized to explain the manner in which a line-sequential color signal is scanned according to the invention;

Figures 1, 2, 3, 4, 5, 6:
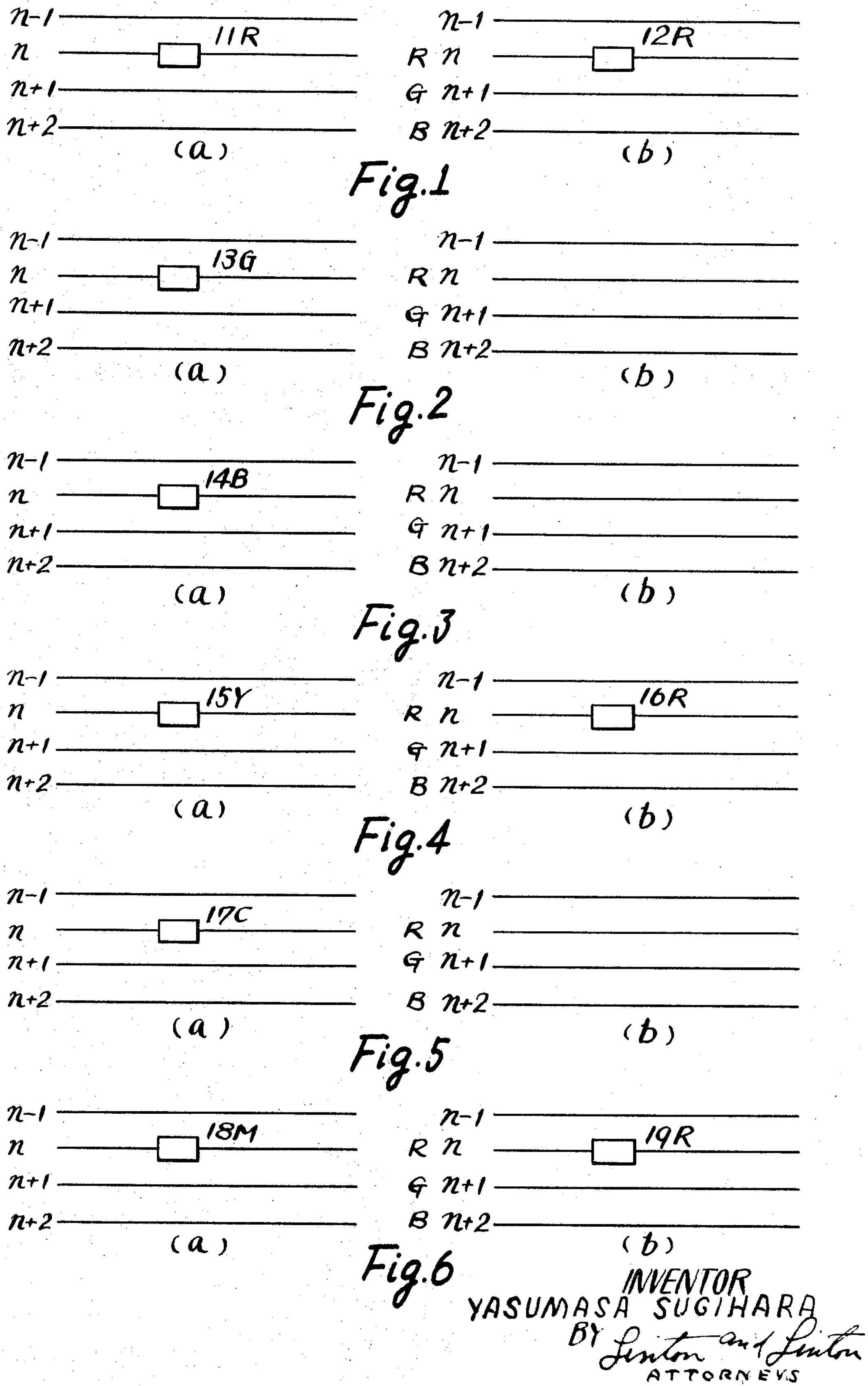

Referring to FIG. 1, let it be assumed that a red elemental area 11R of a televised image is scanned. If the red elemental area 11R appears solely on an $n$ number scanning line at the camera side without extending over adjoining scan lines—$n-1$ or $n+1$ line—it will be reproduced with good fidelity provided the $n$ number scan line at the receiver is allotted at that instant to share a red color component of the television signal, as shown at 12R in FIG. 1(*b*). With a green elemental area 13G scanned by the $n$ number line at the camera as shown at FIG. 2(*a*), while the corresponding scan line at the receiver is allotted for a red color, such green elemental area will be blanked off during the horizontal scanning. A similar situation occurs with a blue elemental area 14B appearing on the $n$ scan line as seen from FIG. 3.

In the case of a yellow elemental area 15Y, the red component of which alone may be reproduced as shown at 16R in FIG. 4.

With a cyan image area 17C scanned on the camera at the $n$ number line, this color image is blanked off as the corresponding $n$ number scan line at the receiver shares red, as shown in FIG. 5.

With a magenta elemental area 18M, there may be reproduced only the red component color of the magenta area as shown at 19R in FIG. 6.

A similar phenomenon of color reproduction takes place with the $n$ number scan line allotted to share blue or green at the receiver as illustrated in FIGS. 1–6 of which FIGS. 3, 4 and 6 represent the worst case where nothing is reproduced which in turn will result in objectionable color flickers in the reproduced picture.

Figure 13:
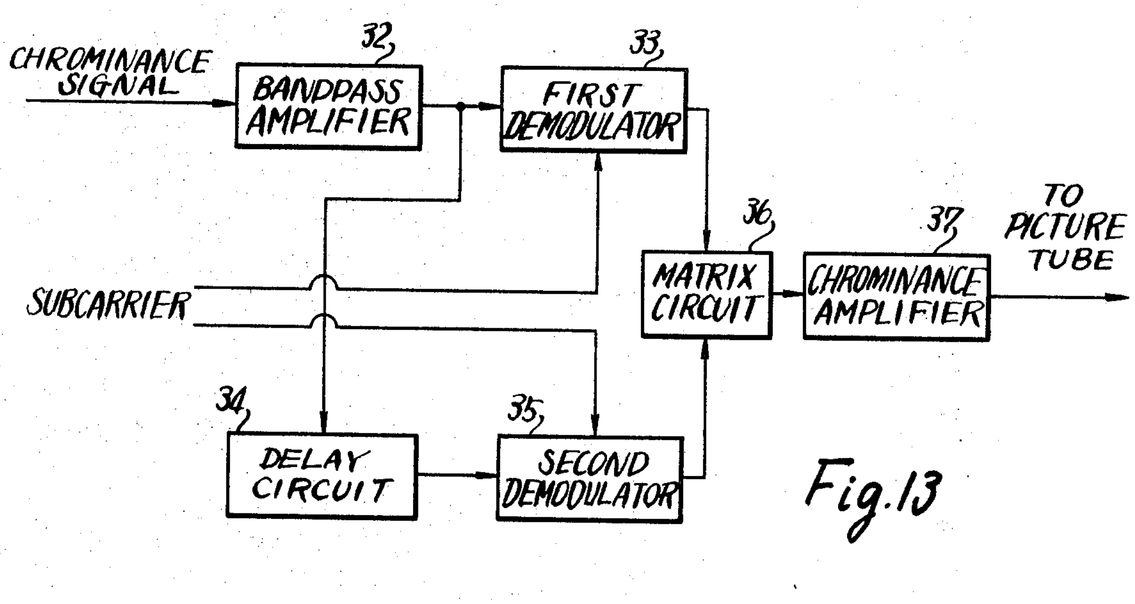
FIG. 13 is a block diagram of a first circuit arrangement embodying the invention for processing a color signal information.

Reference to FIG. 13 shows the first circuit arrangement embodying the invention which will eliminate or alleviate the problem of color flickers resulting from blanking of some of the chrominance information signals for the reasons above described. The circuit arrangement shown in FIG. 13 substantially consists of a first demodulator 33 connected with and adapted to demodulate the output of the usual bandpass amplifier 32, a delay circuit 34 connected with and adapted to give the output of said amplifier a delay corresponding to one horizontal scanning cycle, a second demodulator 35 of the same characteristic with the first demodulator for demodulating the output of said delay circuit at exactly the same axis of color detection as that of the first demodulator, a matrix circuit 36 adapted to combine the outputs of the two demodulators and a chrominance signal amplifier 37 adapted to amplify the output of said matrix for application to the control electrode in a color television picture tube of the single-electron gun type generally shown at 62 in FIG. 14. With this circuit arrangement, let it be assumed that a chrominance signal corresponding to the $n$ number scan is being applied to the first demodulator 33 for modulation of a red color. Then, the second demodulator receives a chrominance signal corresponding to the $n-1$ number scan and one horizontal line behind the signal applied to the first demodulator and thus similarly demodulates the red color component. In this manner, these two chrominance signals covered by the two adjacent scanning lines are combined at the matrix circuit 36 and delivered to the picture tube.

A color signal to scanning line relationship as achieved by the first circuit arrangement just described will be discussed with reference to FIGS. 7 through 12 inclusive.

Figure 7:
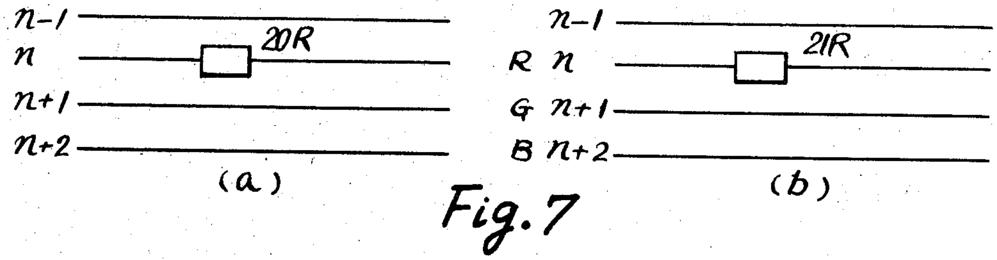
Figure 8:
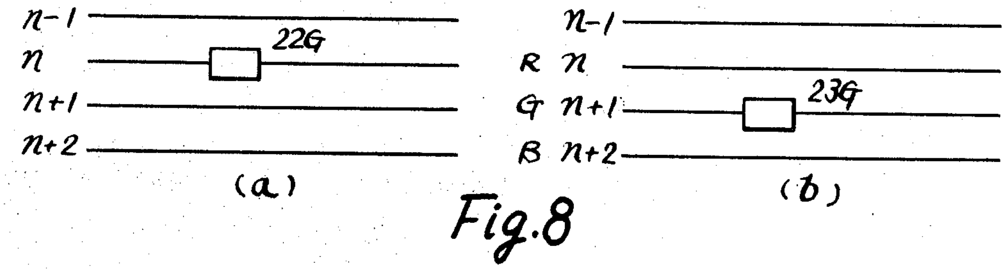

As shown at FIG. 7(*a*), while the red elemental area 20R appears on the *n* number scan line of the camera, it can be reproduced with fidelity as it is scanned by the corresponding line sharing the red color component at the receiver, as is shown at 21R in FIG. 7(*b*). In such instance, the signal to be applied to the second demodulator 35 is one horizontal scanning cycle behind the signal applied to the first demodulator 33, and since the detection axis has been shifted to green, there will be no output from the second demodulator.

With the green elemental area 22G on the *n* number scan line, there appears no image on the corresponding scanning line at the receiver as the latter is assigned to the red color component. However, as the signal having a delay of one horizontal scanning line is applied to the second demodulator 35 of FIG. 13 or FIG. 14, there will appear a green color on the $n+1$ number scan at the receiver as shown at 23G in FIG. 8(*b*), the latter line is shifted one scan line from the former. This would be negligible to the eye as the line-to-line spacing is narrow enough. The example of FIG. 8 excels the conventional scanning process shown in FIG. 2, the latter being incapable of reproducing the green color component.

Figure 9:
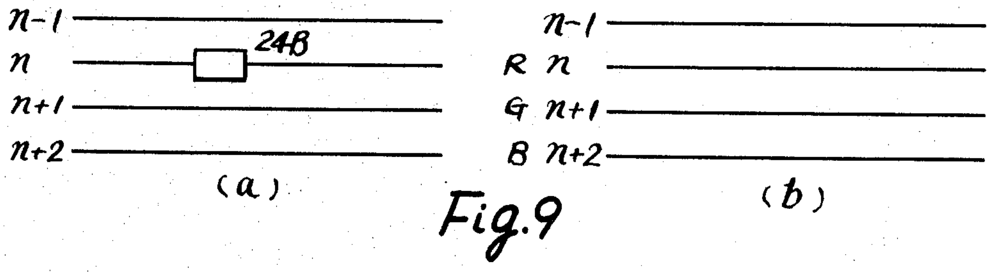

In the case of FIG. 9 where a blue elemental area 24B appears on the camera, there will be no color reproduction at the receiver as the second demodulator 35 is demodulating with the green detection axis, and the results are the same with the case of FIG. 3.

Figure 10:
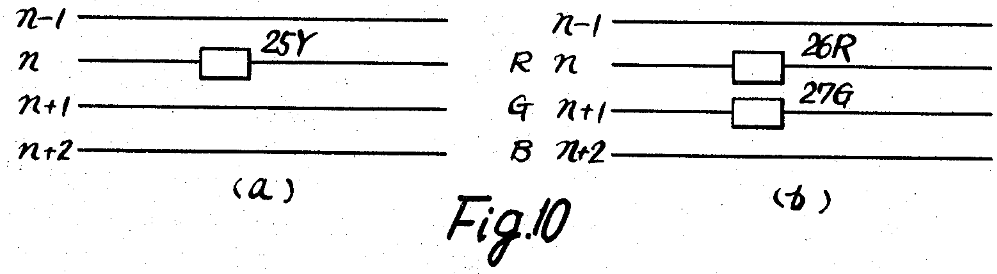

As a yellow elemental area 25Y appears on the camera, the red component of this area will be reproduced on the *n* number scan line which is assigned to red, as shown at 26R in FIG. 10(*b*). In such instance, the green component of the yellow information 25Y will also be reproduced at the receiver on the next scan line $n+1$ as shown at 27G because the output of the delay circuit 34 which is one horizontal scanning cycle behind has been applied to the second demodulator 35 working with a green color detection axis. The 26R and 27G scan lines are closely aligned to present a substantially yellow image to the eye of the viewer. This example has a practical advantage over the case of FIG. 4.

Figure 11:
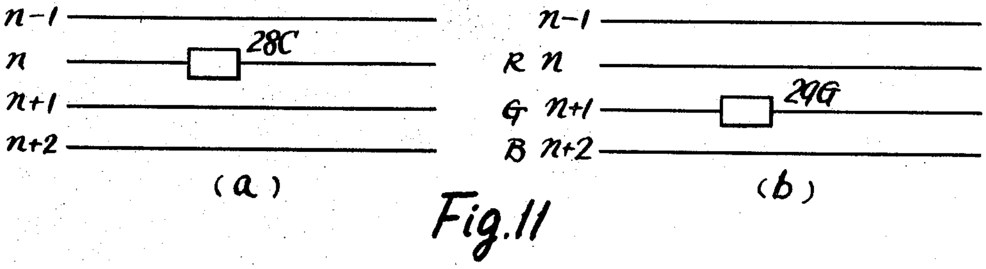
Figure 12:
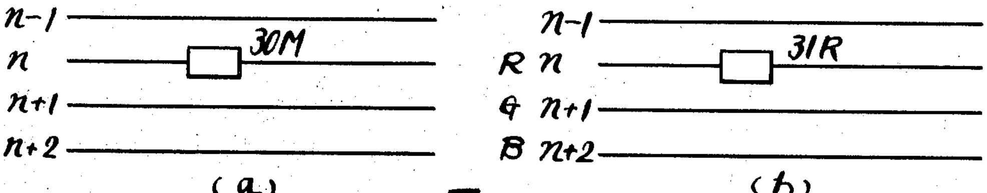

With a cyan color signal which is free of a red component, there will be no color reproduced on the *n* number scan line at the receiver as shown at FIG. 11(*b*). However, the green component of the elemental area 28C can be effectively reproduced at the receiver due to the delayed signal applied from the delay circuit 34 to the second demodulator which is then demodulating the signal at the green detection axis. Although there is some color phase difference between cyan and green, the example of FIG. 11 would be far better than the case of FIG. 5 where nothing is reproduced.

With magenta scanned on the camera, the red component of magenta is reproduced on the *n* number scan line at the receiver. However, as magenta is free of a green component, there will be no signal developed at the second demodulator which operates on the green detection axis, as is the case with FIG. 6.

It will be appreciated that the circuit arrangement of FIG. 13 according to the invention owes its merits to the proven fact that signals on two successive scan lines appear undistinguishably analogous to the human eye, and it is useful and effective in providing a reproduced color image wtih increased fidelity and without objectionable flickers.

Figure 14:
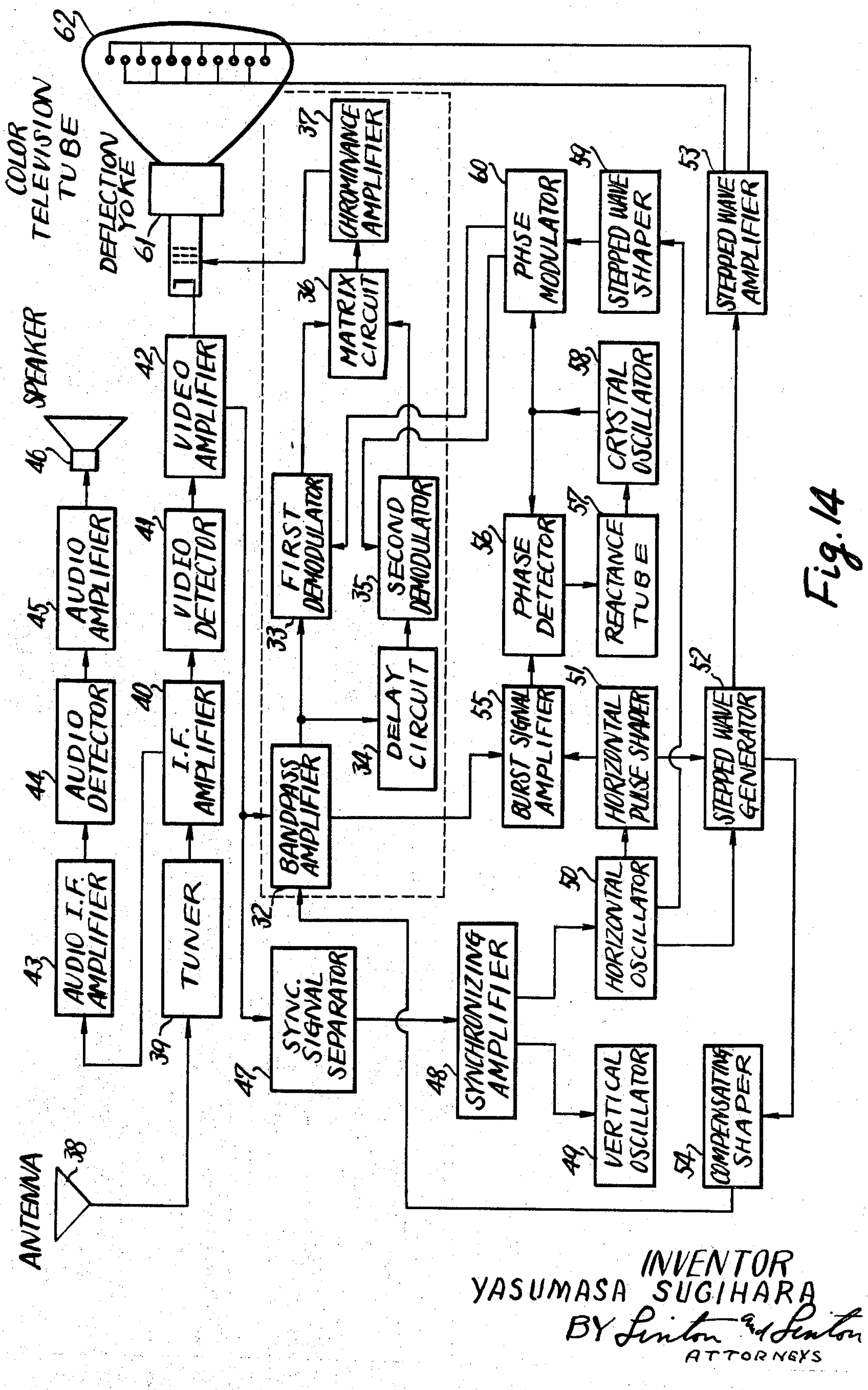
FIG. 14 is a block diagram of a color television receiver of the line-sequential type incorporating the circuit arrangement of FIG. 13.

Reference to FIG. 14 shows a block diagram of a typical color television receiver of the line-sequential type including a single-electron gun picture tube, wherein the first circuit arrangement of FIG. 13 is incorporated. The color television signal received at the antenna 38 is delivered to the tuner 39. Designated at 40 is an intermediate frequency amplifier; at 41 is a video detector; at 42 is a video amplifier; at 43 is an audio intermediate frequency amplifier; at 44 is an audio detector; at 45 is an audio amplifier; at 46 is a speaker; at 47 is a synchronizing signal separator; at 48 is a synchronizing signal amplifier and at 49 is a vertical oscillation/deflection output circuit. Part of the output of the oscillator 49 is delivered to the deflection yoke 6 of the picture tube 62. The output of the horizontal oscillator or AFC circuit 50 is partly delivered to the deflection yoke 61. The above circuits are all similar to those used in an ordinary monochrome television receiver, and hence will require no further description.

The horizontal pulse shaper 51 is adapted to produce a horizontal pulse with which to drive a stepped wave generator 32 which in turn generates a voltage having three steps in its waveform. This voltage, after amplified by the amplifier 53, is applied to the color switching grid in the picture tube 62 for sequentially switching between the three primary colors red, green and blue at each horizontal scanning cycle.

The brightness or luminance component of the incoming television signal is delivered through the video amplifier 42 in the usual manner to the cathode of the picture tube 62, while the first grid is supplied with color difference signals $R-Y$, $G-Y$ and $B-Y$ in a predetermined sequence. To produce these color difference signals, the output of the crystal oscillator 58 energized by a subcarrier frequency is phase-modulated at the phase-modulator 60 by the stepped waveform voltage from the stepped wave shaper 59 thereby developing a line-sequential detection axis to be used for demodulation of the chrominance signal. The phase-modulated signal from the phase-modulator 60 is delivered simultaneously to the first and second demodulators 33 and 35 according to the invention. The output of the bandpass amplifier 32 is supplied to the first demodulator in the usual manner and also to the delay circuit 34 according to the invention for providing an output signal having a delay corresponding to one horizontal scanning cycle, said delayed signal being further delivered to the second demodulator 35. The outputs of these two demodulators are combined at the matrix circuit 36, as already stated, and amplifier at the chrominance amplifier 37 for application to the control electrode in the picture tube.

Designated at 54 is a shaper for compensating the reduction factor of the NTSC signal; at 55 is a burst signal amplifier for deriving the burst from the composite video signal; at 56 is a phase detector; at 57 is a reactance tube and at 58 is a crystal oscillator, the last three circuits being arranged to form a loop.

Figure 15:
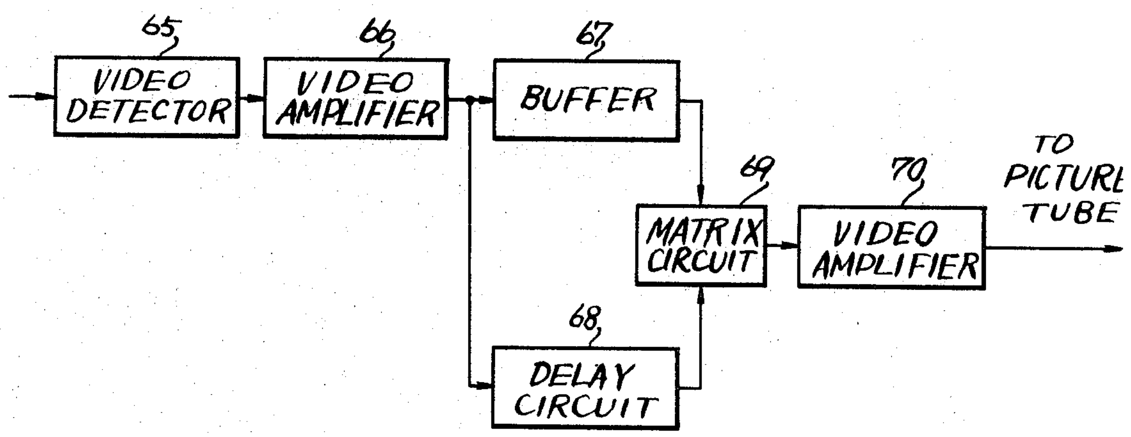
FIG. 15 is utilized to explain the manner in which a luminance signal information is scanned according to the invention.
Figure 16:
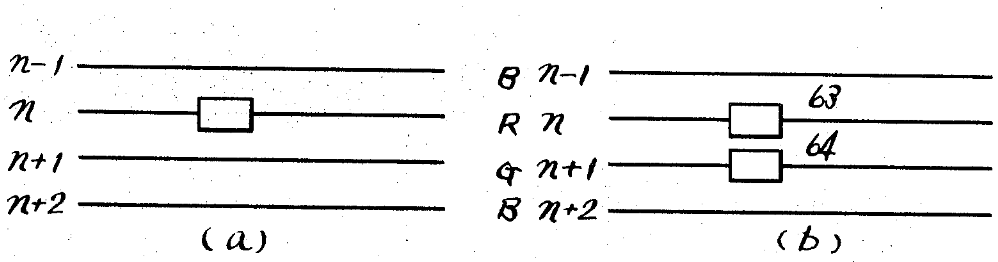
FIG. 16 is a block diagram of a second circuit arrangement embodying the invention for processing a black-and-white signal information.

Now, reference to FIG. 15 shows the second circuit arrangement embodying the invention which is used when the receiver operates with a monochrome television signal. The circuit arrangement comprises in combination with the usual video detector 65, video amplifier 66 and buffer 67, a delay circuit 68 adapted to provide the output of the buffer amplifier 67 with a delay corresponding to one horizontal scanning cycle, a matrix circuit 69 adapted to combine the output of the buffer amplifier 67 and the output of the delay circuit 68 and a video amplifier 70 adapted to amplify the combined output of the matrix circuit 69 for application to the picture tube 62. The advantage of this circuit arrangement will be obvious from the illustration of FIG. 16 wherein a fine white elemental area appearing on the *n* number scanning line at the camera may be reproduced more like a light yellowish color as the delayed signal from the delay circuit 68 is inserted on the $n+1$ scan line assigned to green next to the *n* scan line assigned to red, the green and red colors being superimposed to present a yellowish hue to the eye of the viewer. This hue is far less contributory to flickers than mere red. In addition, most television receivers operate on the principles of interlaced scanning so that any fine elemental area of the televised image spans over two adjacent scan lines, and therefore, the problem of color interference in the monochrome mode of operation of the compatible television receiver will be considerably alleviated.

Figure 21:
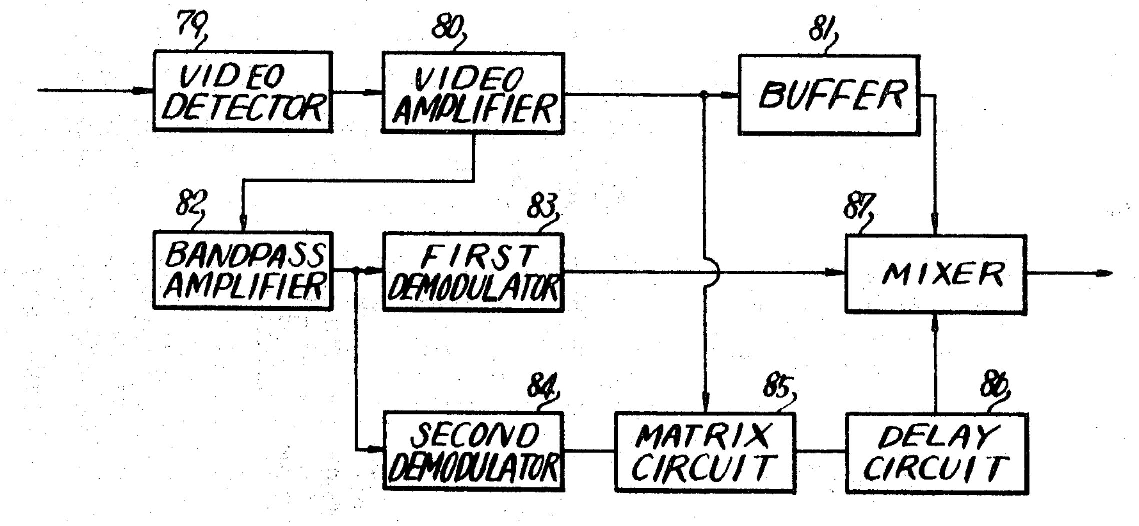
FIG. 21 is a block diagram of a third circuit arrangement embodying the invention for processing either a color or monochrome television signal.

The third circuit arrangement embodying the invention, as shown in FIG. 21, is in effect a combination of the first and second embodiments. In combination with the usual video detector 79, video amplifier 80, buffer amplifier 81 and bandpass amplifier 82, there are arranged a first demodulator 83 and a second demodulator 84 respectively for demodulating the output of the bandpass amplifier 82, a matrix circuit 85 for combining the output of the second demodulator 84 and the output of the video amplifier 80 past a 0.8 microsecond delay line (not shown), a delay circuit 86 for providing an output signal which is one horizontal scanning cycle behind the chrominance signal from the first demodulator 83 and a mixer circuit 87 for mixing the luminance signal from the buffer 81, the chrominance signal from the first demodulator 83 and the delayed chrominance signal from the delay circuit 86. The detection axis of the second demodulator 84 is 120 degrees ahead of that of the first demodulator 83 according to the invention, so that while the first demodulator 83 is detecting the red chrominance signal, the second demodulator 84 detects the green chrominance signal.

Now, let it be assumed that the output of the buffer 81 is a luminance signal included in the $n$ number scan line assigned to red. The demodulator 83 accordingly detects the red chrominance signal included in the $n$ scan line. The luminance signal and the chrominance signal from the demodulator 83 are then mixed at the mixer 87. In this instance, the output of the second demodulator 84 is scanned on the $n-1$ line and delivered to the mixer 87 whose output is the combination of the $n$ and $n-1$ scan line information which is red.

Figure 17:
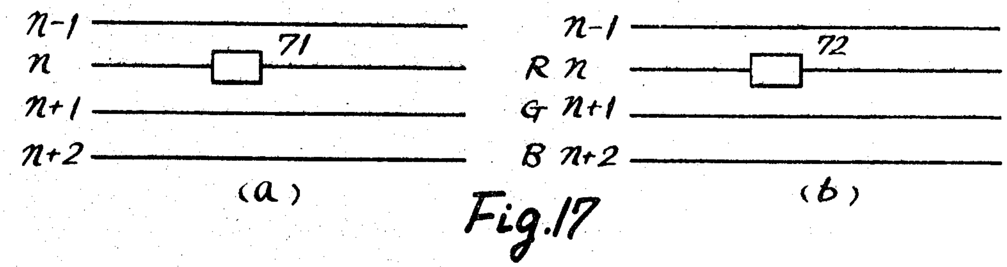
FIGS. 17 and 18 are utilized to explain the conventional manner in which the line-sequential color information is scanned.
Figure 19:
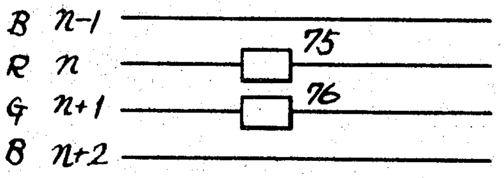
FIGS. 19 and 20 are utilized to explain the manner in which the line-sequential color information is scanned according to the invention.
Figure 20:
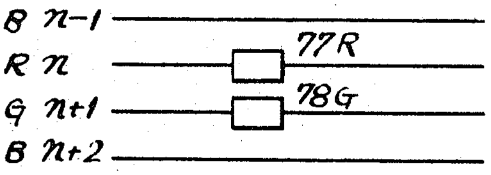

FIGS. 19 and 20 show the manner in which an elemental area of the television image is reproduced on the $n$ and $n+1$ scan lines as shown at 75 and 76 in FIG. 19. If the $n$ scanning line is representative of a green color, the resulting combined color would be more like yellow to the eye and closer to a white color than that on the $n$ scan line 72 of FIG. 17($b$).

Figure 18:
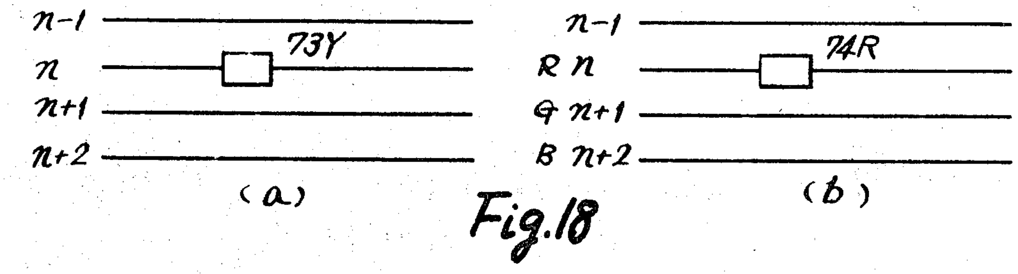

If a yellow elemental area 73Y appears on the camera, this will be scanned by the $n$ and $n+1$ lines at the receiver according to the invention and it will be reproduced as a substantially yellow image when the red scan line 77R is superimposed upon the green scan line 78G as shown in FIG. 20. This is in good contrast to the case of FIG. 18 where the yellow image 73 scanned on the camera tends to grow reddish as it is scanned by the red scan line 74 at the conventional receiver.

In practice, the second and third embodiments of the invention may be respectively built into a color television receiver where designated by chain-line in the general block diagram of FIG. 14 as will be obvious to those skilled in the art.

While the invention has been described in connection with the NTSC system, it will be understood that the circuit concepts of the invention may likewise be applied to SECAM and PAL systems with similar results.

What is claimed is:

1. In a line-sequential color television receiver for converting a simultaneous color television signal to the line-sequential color television signal, the combination comprising a video amplifier connected to the output of a video detector for amplifying a television video signal detected by said detector, a buffer amplifier connected to the output of said video amplifier for passing color signal components of the simultaneous television signals, a first demodulator connected to the output of a bandpass amplifier for demodulating the output signals thereof at a detection axis representing a particular primary color appearing in each horizontal scanning period, a second demodulator connected to the output of said bandpass amplifier for demodulating the output signals thereof at the detection axis of about 120° ahead of that of said first demodulator in each horizontal scanning period, a matrix circuit connected to the outputs of said video amplifier and second demodulator to combine the output signals thereof, a delay circuit connected to the output of said matrix circuit to delay the output signal by one horizontal scanning period and a mixer to mix the signal from said buffer amplifier, the output signal of said first demodulator and the output signal of said matrix circuit.

References Cited

UNITED STATES PATENTS

| | | | |
|---|---|---|---|
| 2,739,181 | 3/1956 | Sleeper et al. | 178—5.2 |
| 2,938,945 | 5/1960 | de France | 178—5.4 |
| 2,993,086 | 7/1961 | de France | 178—5.2 |
| 3,162,838 | 12/1964 | Sauvanet | 178—5.4 |
| 3,267,211 | 8/1966 | Melchior. | |

ROBERT L. GRIFFIN, Primary Examiner

R. P. LANGE, Assistant Examiner